(12) United States Patent
Kazama et al.

(10) Patent No.: US 10,060,815 B2
(45) Date of Patent: Aug. 28, 2018

(54) PRESSURE SENSOR

(71) Applicant: Hitachi Automotive Systems, Ltd., Hitachinaka-shi, Ibaraki (JP)

(72) Inventors: Atsushi Kazama, Tokyo (JP); Junji Onozuka, Hitachinaka (JP); Hiroshi Onuki, Hitachinaka (JP); Miho Tobita, Hitachinaka (JP); Masayuki Hio, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 146 days.

(21) Appl. No.: 15/035,838

(22) PCT Filed: Nov. 12, 2014

(86) PCT No.: PCT/JP2014/079910
§ 371 (c)(1),
(2) Date: May 11, 2016

(87) PCT Pub. No.: WO2015/076158
PCT Pub. Date: May 28, 2015

(65) Prior Publication Data
US 2016/0313199 A1    Oct. 27, 2016

(30) Foreign Application Priority Data

Nov. 20, 2013  (JP) ................. 2013-239454

(51) Int. Cl.
*G01L 9/00*  (2006.01)
*G01L 9/04*  (2006.01)
(Continued)

(52) U.S. Cl.
CPC .......... *G01L 9/0055* (2013.01); *G01L 9/0044* (2013.01); *G01L 19/0038* (2013.01); *G01L 19/0084* (2013.01); *G01L 19/04* (2013.01)

(58) Field of Classification Search
CPC ....... G01L 9/00; G01L 9/0038; G01L 9/0044; G01L 9/0047; G01L 9/0051;
(Continued)

(56) References Cited

U.S. PATENT DOCUMENTS 4,454,771 A * 6/1984 Shimazoe ................. G01L 1/18
73/777
4,683,755 A * 8/1987 Samek .................. G01L 1/2293
29/621.1
(Continued)

FOREIGN PATENT DOCUMENTS

EP  0 239 933 A2  10/1987
EP  2 924 408 A1  9/2015
(Continued)

OTHER PUBLICATIONS

International Search Report (PCT/ISA/210) issued in PCT Application No. PCT/JP2014/079910 dated Jan. 6, 2015, with English translation (two (2) pages).
(Continued)

*Primary Examiner* — Nguyen Ha
(74) *Attorney, Agent, or Firm* — Crowell & Moring LLP

(57) ABSTRACT

In a pressure sensor having a configuration in which strain gauges are provided on a diaphragm, a change in sensor characteristic caused by a positional shift of the strain gauges is suppressed, and a change in sensor output in response to a change in temperature is suppressed. The pressure sensor is a pressure sensor obtained by arranging, on a diaphragm having a long side and a short side, a sensor chip in which four strain gauges having the same characteristic and constituting a bridge circuit are provided, the pressure sensor being for detecting, in the bridge circuit, voltage output that is in proportion to a pressure applied to the diaphragm, and the pressure sensor is configured as follows: the four strain gauges are arranged to be adjacent to (Continued)

one another in the vicinity of the center of the diaphragm so that two strain gauges are arranged along the short side and the other two strain gauges are arranged along the long side; and the diaphragm has a thin portion in a long-side direction seen from the sensor chip.

20 Claims, 11 Drawing Sheets

(51) Int. Cl.
  G01L 19/00 (2006.01)
  G01L 19/04 (2006.01)
(58) Field of Classification Search
  CPC ....... G01L 9/0055; G01L 9/0084; G01L 9/02; G01L 9/04; G01L 9/06; G05D 7/0635; G01F 1/86; Y10T 137/7837
  See application file for complete search history.

(56) References Cited

U.S. PATENT DOCUMENTS

| | | | |
|---|---|---|---|
| 5,317,921 A | 6/1994 | Kremidas | |
| 5,872,315 A * | 2/1999 | Nagase | G01L 9/0052 73/726 |
| 7,404,330 B2 | 7/2008 | Uchigashima et al. | |
| 2001/0001550 A1* | 5/2001 | Bryzek | B81B 3/0072 338/36 |
| 2001/0039837 A1 | 11/2001 | Tanizawa et al. | |
| 2006/0144153 A1* | 7/2006 | Brosh | G01L 9/0052 73/715 |
| 2009/0212899 A1 | 8/2009 | Gross | |
| 2011/0259109 A1* | 10/2011 | Ahles | G01L 9/0045 73/727 |

FOREIGN PATENT DOCUMENTS

| | | | | |
|---|---|---|---|---|
| JP | 2-39574 A | | 2/1990 | |
| JP | 02039574 A | * | 2/1990 | .............. G01L 9/04 |
| JP | 9-8329 A | | 1/1997 | |
| JP | 2615887 B2 | | 6/1997 | |
| JP | 4161410 B2 | | 10/2008 | |
| JP | 2013-11478 A | | 1/2013 | |
| JP | 5186725 B2 | | 4/2013 | |

OTHER PUBLICATIONS

Extended European Search Report issued in counterpart European Patent Application No. 14864313.3 dated Jun. 27, 2017 (Eleven (11) pages).

* cited by examiner

MODEL 1: NO DIAPHRAGM

MODEL 2: DIAPHRAGM

MODEL 3: DIAPHRAGM + GROOVE

PRESSURE SENSOR

TECHNICAL FIELD

The present invention relates to a pressure sensor for detecting a pressure by using deformation of a diaphragm that has received a pressure.

BACKGROUND ART

A pressure sensor having a configuration in which strain gauges are provided on a diaphragm is well known. This pressure sensor detects a pressure by using a change in resistance of the strain gauges based on deformation of the diaphragm caused by a pressure. Generally, four strain gauges constitute a bridge circuit, and a differential voltage output that is in proportion to a pressure is obtained from this bridge circuit to detect the pressure. Herein, the bridge circuit is mainly used for temperature compensation. This is because, in the case where the four strain gauges are similarly changed, output of the bridge circuit is not changed even when the strain gauges have temperature characteristics.

For a low pressure equal to or lower than about 1 MPa, there is frequently used a pressure sensor having a configuration in which a silicon diaphragm obtained by processing a silicon substrate to form a diaphragm is provided. PTL 1 discloses that a thin diaphragm is formed by etching a back surface of a silicon substrate and strain gauges made of polycrystal silicon are formed on the diaphragm. According to PTL 1, when two of four strain gauges are arranged in a peripheral portion of the diaphragm and the other two strain gauges are arranged in a central portion of the diaphragm, stresses generated in the strain gauges by application of a pressure become a compressive stress and a tensile stress. PTL 1 further discloses that, when the diaphragm has a rectangular shape, a stress in a vertical direction which negatively effects on sensor sensitivity can be reduced in the strain gauges arranged at the center of the diaphragm.

For a high pressure equal to or higher than about 1 MPa, or when, for example, silicon cannot be exposed because corrosion resistance is needed, there is frequently used a pressure sensor having a configuration in which a diaphragm made of stainless steel is provided and semiconductor strain gauges are attached on the diaphragm or a sensor chip on which semiconductor strain gauges are provided is attached thereon, PTL 2 discloses that a sensor chip constituted by a single crystal semiconductor in which strain gauges are provided is bonded onto a circular diaphragm made of metal. Note that a size of the sensor chip is larger than that of the diaphragm and the sensor chip is bonded so that the strain gauges on the sensor chip are arranged in a peripheral portion of the diaphragm. According to PTL 2, when two of four strain gauges are arranged in a circumferential direction and the other two strain gauges are arranged in a radial direction, stresses generated in the strain gauges by application of a pressure become a compressive stress and a tensile stress, and thus sensor sensitivity is obtained. PTL 2 further discloses that, when the sensor chip has a polygonal shape that is as close to a circular shape as possible, a bad influence of a thermal stress caused by a difference between coefficients of thermal expansion of the sensor chip and the diaphragm can be removed as much as possible.

CITATION LIST

Patent Literatures

PTL 1: Japanese Patent No. 2615887
PTL 2: Japanese Patent No. 4161410

SUMMARY OF INVENTION

Technical Problem

In the above conventional pressure sensors, at least two of the four strain gauges are arranged in an outer circumferential portion of the diaphragm. Herein, stress distribution in the diaphragm generated in response to application of a pressure changed more steeply in the outer circumferential portion than in a central portion thereof. Therefore, a detection error caused by a positional shift of the strain gauges is larger than a detection error in an inner circumferential portion thereof. In particular, in a pressure sensor having a configuration in which a sensor chip is bonded to a diaphragm made of metal as in PTL 2, it is problematic in that a characteristic of the sensor is easily changed when positions of strain gauges on the sensor chip are shifted with respect to a position of an edge of the diaphragm due to a shift of a bonding position of the sensor chip.

Further, in the pressure sensor having the configuration in which the sensor chip is bonded, the semiconductor sensor chip made of silicon or the like and the diaphragm made of metal have different coefficients of thermal expansion, and therefore thermal strain is generated in accordance with a change in temperature. Thus, a change in sensor output caused by this thermal strain is also problematic.

An object of the present invention is to achieve a pressure sensor in which variations in sensor characteristics caused by a processing error, an assembling error, or the like are small and a change in sensor output in response to a change in temperature is small.

Solution to Problem

In order to solve the above problems, a pressure sensor of the present invention is a pressure sensor obtained by bonding, onto a diaphragm having a long side and a short side, a semiconductor sensor chip in which four strain gauges having the same characteristic and constituting a bridge circuit are provided, the pressure sensor being for detecting, in the bridge circuit, voltage output that is in proportion to a pressure applied to the diaphragm, wherein the four strain gauges are arranged to be adjacent to one another in the vicinity of the center of the diaphragm so that two strain gauges are arranged along the short side and the other two strain gauges are arranged along the long side, and the diaphragm has a thin portion in a long-side direction seen from arrangement positions of the strain gauges.

Advantageous Effects of Invention

According to the present invention, it is possible to achieve a pressure sensor in which variations in sensor characteristics caused by a processing error, an assembling error, or the like are small and a change in sensor output in response to a change in temperature is small.

DESCRIPTION OF EMBODIMENTS

Figure 1A:
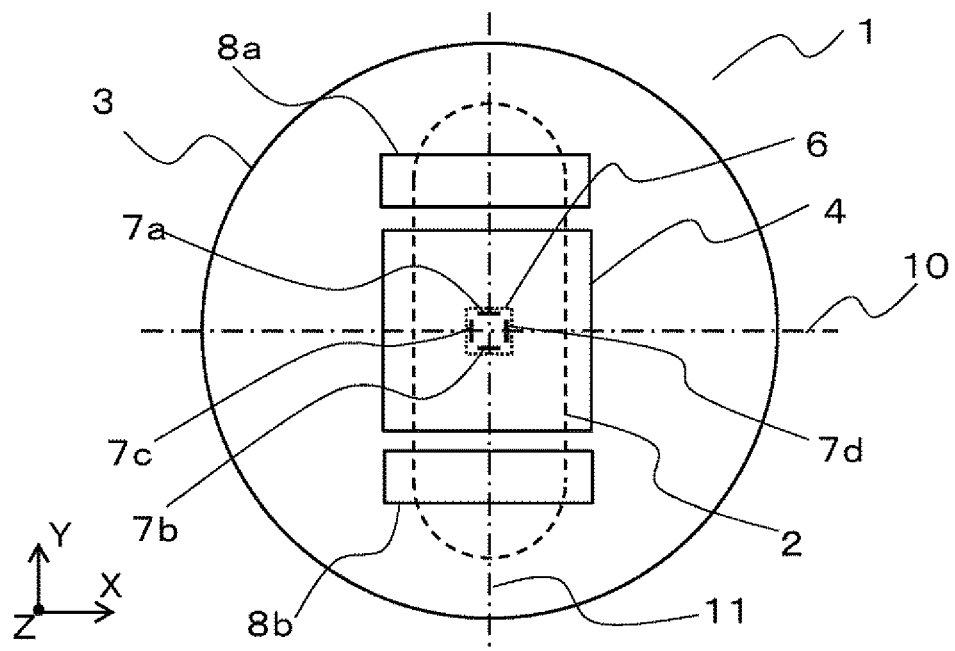
FIG. 1A is a plan view.
Figure 1B:
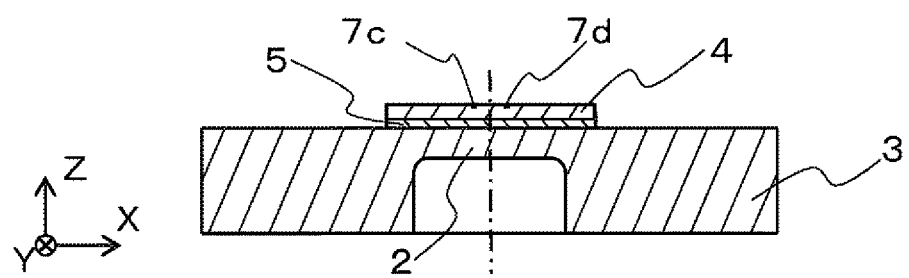
FIG. 1B is a cross-sectional view.
Figure 1C:
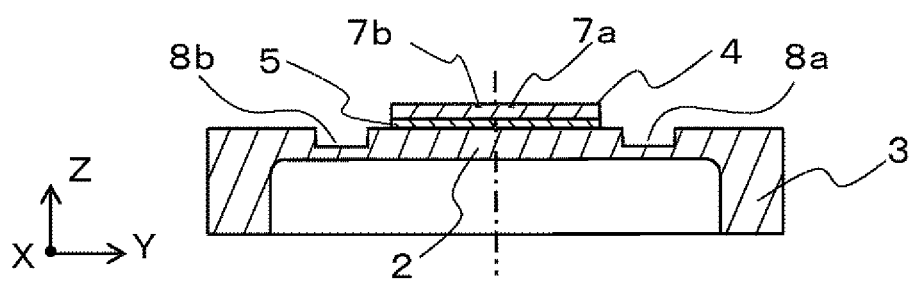
FIG. 1C is a cross-sectional view of Example 1 in the present invention.
Figure 2:
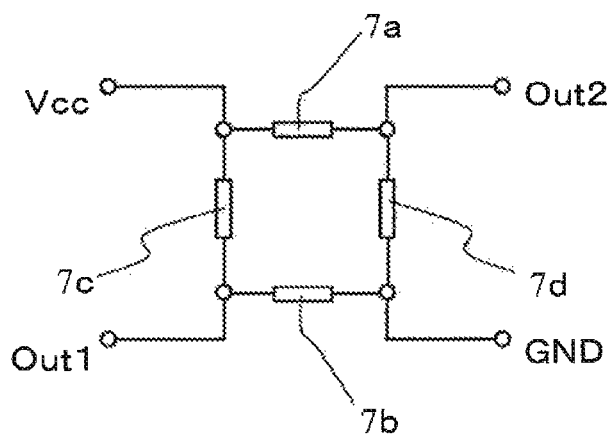
FIG. 2 is an explanatory view illustrating an example of a bridge circuit.

FIGS. 1(a) to 1(c) are a plan view and cross-sectional views of Example 1 of a pressure sensor in the present invention. In FIG. 1(a), a center line along an X axis is defined to be an X center line 10, and a center line along a Y axis is defined to be a Y center line 11. FIG. 1(b) is a cross-sectional view taken along the X center line 10, and FIG. 1(c) is a cross-sectional view taken along the Y center line 11. A pressure sensor 1 has a configuration in which a rectangular sensor chip 4 is bonded via a bonding layer 5 onto a sensor housing 3 made of metal in which a diaphragm 2 is provided. In FIG. 1(a), an external shape of the diaphragm 2 is indicated by a dotted line. In the sensor chip 4, a gauge region 6 is provided in a central portion of a surface to which the diaphragm 2 is not bonded, and first to fourth strain gauges 7a to 7d are provided in the gauge region 6. The first to fourth strain gauges 7a to 7d are connected by wires (not illustrated) and constitute a Wheatstone bridge circuit illustrated in FIG. 2. The diaphragm 2 has an anisotropic shape having a short side and a long side, and a short-side direction is defined to be the X axis and a long-side direction is defined, to be the Y axis. The gauge region 6 is located in a central portion of the diaphragm 2. The first strain gauge 7a and the second strain gauge 7b are arranged so that the short-side direction (X axis direction) of the diaphragm 2 serves as a current direction, whereas the third strain gauge 7c and the fourth strain gauge 7d are arranged so that the long-side direction (Y axis direction) of the diaphragm 2 serves as a current direction. A first groove 8a and a second groove 8b are provided on a surface of the sensor housing 3 to which the sensor chap 4 is bonded. The first groove 8a and the second groove 8b are provided on sides of the sensor chip 4 in the long-side direction and are provided on both sides of the sensor chip so that the sensor chip 4 is positioned between the first groove 8a and the second groove 8b. Because of the grooves 8a and 8b, portions thinner than a portion on which the sensor chip 4 is mounted are provided on sides of the sensor chip 4 along the Y axis on the diaphragm 2.

In response to a pressure applied to a surface opposite to a surface of the diaphragm 2 to which the sensor chip 4 is bonded, in the pressure sensor 1, the diaphragm 2 is deformed to change a stress of each of the strain gauges 7a to 7d, and a resistance of each of the strain gauges 7a to 7d is accordingly changed. A change in resistance value serves as differential output of the bridge circuit, and output that is in proportion to the pressure is obtained.

The sensor housing 3 having the diaphragm 2 is made of metal such as stainless steel. The sensor housing 3 has a cylindrical shape, and a portion, which is obtained by processing a central portion on one surface to leave a thin portion, serves as the diaphragm 2. As a processing method, cutting, electric discharge machining, press working, or the like can be used. An end portion of the surface on which the diaphragm 2 has been processed has a round shape. This alleviates stress concentration generated in the end portion when a pressure is applied.

The sensor chip 4 is fabricated by using a single crystal silicon substrate as a material. Each of the strain gauges 7a to 7d is a p-type silicon piezoresistive gauge fabricated, by impurity diffusion. As the silicon substrate, a silicon substrate having a crystal plane (100) is used, and the X axis and the Y axis correspond to a silicon crystal axis <110>. Therefore, the first to fourth strain gauges 7a to 7d are all piezoresistive gauges in a p-type silicon <110> direction.

Au/Sn solder is used for the bonding layer 5. As a bonding process, for example, bonding is performed as follows: a Ni/Au firm is formed in advance on a bonding surface of the sensor chip 4 by sputtering; a Sn film is formed in advance in a region of the diaphragm 2 to which the sensor chip 4 is to be bonded by plating; pellet-like Au/Sn is inserted to be positioned; and Au/Sn is melted by heating.

In the pressure sensor in Example 1, all the first to fourth strain gauges 7a to 7d are arranged to be adjacent to one another in the gauge region 6 positioned on the central portion of the diaphragm 2. Distribution of stresses generated on the surface of the diaphragm 2 when a pressure is applied is gentler in the central portion of the diaphragm 2 than in a portion in the vicinity of the end portion of the diaphragm 2. Therefore, even in the case where relative positions of the strain gauges 7a to 7d to the diaphragm 2 are shifted when, for example, a bonding position of the sensor chip 4 is shifted, stresses generated in the strain gauges 7 are hardly changed. That is, it is possible to reduce a change in sensor sensitivity to a positional shift.

In the pressure sensor 1 in Example 1, the diaphragm 2 has the anisotropic shape having the long side and the short side, and two of the first to fourth strain gauges are arranged in the long-side direction (Y axis) and the other two strain gauges are arranged in the short-side direction (X axis). In the Wheatstone bridge circuit illustrated in FIG. 2, when a stress difference is generated between a pair of the first gauge 7a and the second gauge 7b and a pair of the third gauge 7c and the fourth gauge 7d, a difference is generated between midpoint potentials and thus output is obtained. Therefore, when the same stress is generated in all the first to fourth gauges 7a to 7d, output is not obtained and the sensor sensitivity is zero. In the case where the four strain gauges 7 are arranged at the center of the diaphragm 2 and the diaphragm 2 has, for example, a circular shape or a square shape, a stress in the central portion of the diaphragm 2 in the X axis direction is the same as the stress in the Y axis direction, and the sensor sensitivity is zero. In Example 1, the diaphragm 2 has the anisotropic shape having the long side in the Y axis direction, and therefore the stress generated in the central portion of the diaphragm 2 in the X axis direction is larger than the stress generated in the Y axis direction. Thus, different stresses are generated between the first strain gauge 7a and the second strain gauge 7b whose current directions are set to be the X axis direction and the third strain gauge 7c and the fourth strain gauge 7d whose current directions are set to be the Y axis direction, and change amounts of resistances based on stress changes are different. Therefore, the sensor sensitivity can be obtained.

The pressure sensor 1 in Example 1 can reduce a change in sensor output in response to a change in temperature.

As described above, the first to fourth strain gauges 7a to 7d are fabricated by impurity diffusion used in manufacturing of semiconductors, and strain gauges having a homogeneous characteristic can be obtained by a highly managed process. With this, characteristics such as initial resistances, piezoresistive coefficients, and temperature dependence of the piezoresistive coefficients are homogenized, and changes thereof in response to a change in temperature are also homogenized. Such homogeneous changes are offset by the Wheatstone bridge circuit, and therefore, output of the pressure sensor in Example 1 is hardly changed in response to a change in temperature.

Further, in Example 1, the first to fourth strain gauges 7a to 7d are arranged to be adjacent to one another. In the case where a temperature difference is generated in the sensor chip 4, resistance changes in the strain gauges may be different when positions of the strain gauges are far from one another, in the pressure sensor in Example 1, because the first to fourth strain gauges 7a to 7b are arranged to be adjacent to one another, the temperature difference is hardly generated between the strain gauges, and, as a result, the sensor output is hardly changed.

Furthermore, all the first to fourth strain gauges 7a to 7d are arranged in a central portion of the sensor chip 4. A thermal stress is generated by a difference between coefficients of thermal expansion of the diaphragm 2 and the sensor chip 4 due to a change in temperature, and this thermal stress is substantially isotropic in a portion other than a portion in the vicinity of an end portion of the sensor chip 4. Therefore, when some of the strain gauges are arranged in the vicinity of the end portion of the sensor chip 4, an output change is easily generated due to a difference in thermal stress. On the contrary, all the first to fourth strain gauges 7a to 7b are arranged in the central portion of the sensor chip 4 in the pressure sensor in Example 1, and therefore stresses in the strain gauges are substantially the same and a difference in thermal stress is hardly generated. Thus, the sensor output is hardly changed.

Herein, a difference is generated between a thermal stress in the X axis direction and a thermal stress in the Y axis direction because the diaphragm 2 has the anisotropic shape. With this, a change in sensor output caused by the anisotropic shape of the diaphragm 2 is generated. Herein, distribution of thermal stresses is gentler in the central portion of the diaphragm 2 than in the end portion. Therefore, the change in sensor output caused by the anisotropic shape of the diaphragm 2 is reduced to be smaller in the vicinity of the central portion of the diaphragm 2 than in the end portion of the diaphragm 2, but the change in sensor output can still be improved.

In order to further reduce the change in sensor output caused by the anisotropic shape of the diaphragm 2, the first groove 8a and the second groove 8b are provided in the sensor housing 3 in Example 1. When the grooves 8a and 8b are arranged to be adjacent to the sensor chip 4 in the long-side direction (Y axis direction) of the diaphragm, it is possible to obtain an effect that causes the thermal stress in the Y axis direction to be close to the thermal stress in the X axis direction. This makes it possible to further reduce a difference in thermal stress between the strain gauges and to further reduce the change in sensor output caused by the anisotropic shape of the diaphragm 2.

The effect of the grooves 8a and 8b is obtained by the inventors of the present invention as a result of detailed study of behavior of thermal deformation of the pressure sensor in response to a change in temperature. The inventors of the present invention have studied in detail a factor of a difference generated between the stress in the X axis direction and the stress in the Y axis direction in response to a change in temperature at the center of the sensor chip 4 including the strain gauges 7a and 7b. In the case where a temperature is increased, the sensor housing 3 having a larger coefficient of thermal expansion is expanded more than the sensor chip 4, and therefore a tensile stress is generated in the whole sensor chip 4. At the same time, bending deformation in an out-of-plane direction also occurs in a portion in which the thin diaphragm 2 and the sensor chip 4 are bonded. This bending deformation is deformation that causes the diaphragm to have a projected shape, and a compressive stress is generated in a surface of the sensor chip 4 on which the strain gauges 7 are provided, but the compressive stress is smaller than the tensile stress applied to the whole sensor chip 4. However, because of the anisotropic shape of the diaphragm 2, a curvature of bending in the X axis direction serving as the short-side direction is smaller than that of bending in the Y axis direction serving as the long-side direction, and a compressive stress in the X axis direction is larger than a compressive stress in the Y direction. A magnitude of the compressive stress subtracted from the tensile stress is larger in the X axis direction, and, as a result, the tensile stress is larger in the Y axis direction. Thus, a stress difference is generated between the X axis direction and the Y axis direction.

In view of this, when the grooves 8a and 8b are provided in the Y axis direction on a portion of the diaphragm 2 on which the sensor chip 4 is mounted, rigidity of the sensor housing 3 in the axis direction is reduced to reduce the thermal stress applied to the sensor chin in the Y axis direction. As a result the thermal stress in the Y axis direction is close to the thermal stress in the X axis direction, and a stress difference between the X axis direction and the axis direction can be reduced.

Figure 3A:
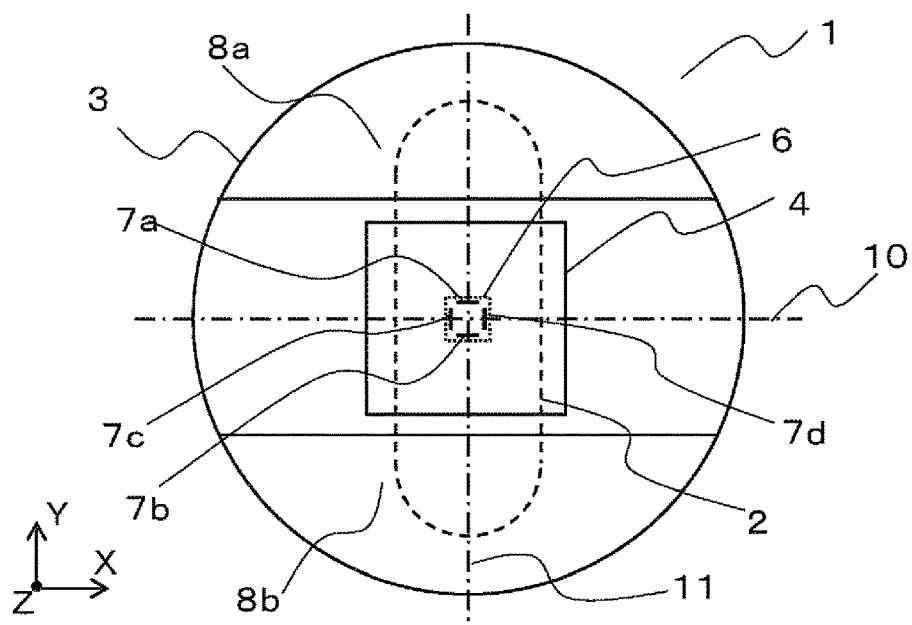
FIG. 3A is a plan view.
Figure 3B:
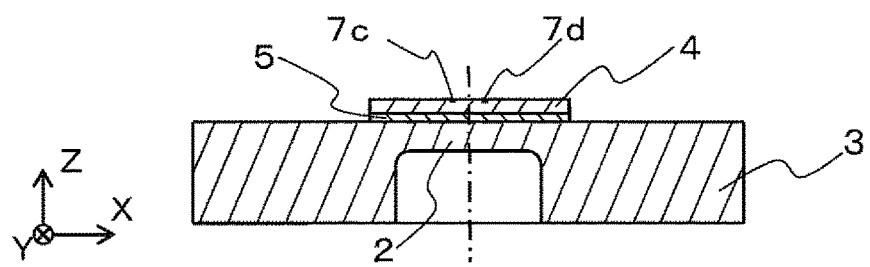
FIG. 3B is a cross-sectional view.
Figure 3C:
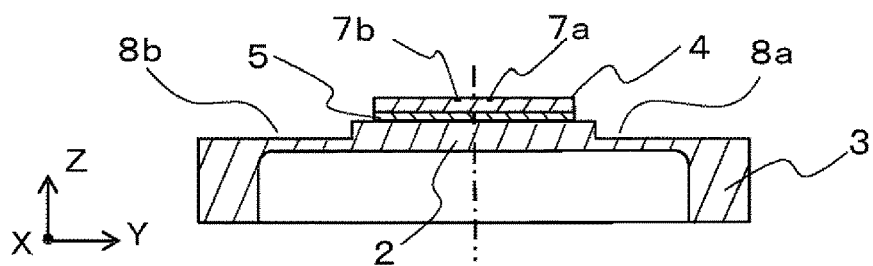
FIG. 3C is a cross-sectional view of a modification example of Example 1 in the present invention.

Positions of the grooves 8a and 8b are preferably close to the sensor chip 4 because an effect of reducing a stress applied to the sensor chip 4 is high. Therefore, although the end portion of the sensor chip 4 and end portions of the grooves 8a and 8b may match with each other, the grooves 8a and 8b are desirably provided at positions apart therefrom by a certain distance of about, for example, 0.1 mm, considering a shift of the bonding position of the sensor chip 4. The grooves 8a and 8b can have various shapes. As illustrated in FIGS. 1(a) to 1(c), the length thereof in the X axis direction is desirably longer than the length of the sensor chip 4 because the stress applied to the sensor chip 4 is easily reduced. However, a certain effect can be obtained even in the case where the length is shorter than that of the sensor chip 4 and is not limited. As illustrated in FIGS. 3(a) to 3(c), the first groove 8a and the second groove 8b may be provided like steps formed in a wide region so as to reach an end portion of the sensor housing 3. This makes it possible to increase a region of the thin portion of the diaphragm 2, and an effect of reducing the stress in the Y axis direction is improved. Further, a structure of the sensor housing 3 is simplified, and therefore the sensor housing 3 can be easily manufactured.

Regarding a positional relationship between the diaphragm 2 and the sensor chip 4, as in Example 1, a dimension of the sensor chip 4 is desirably larger than a dimension of the diaphragm 2, seen in the X axis direction (in a YZ cross-section).

With the above configuration, the end portion of the sensor chip 4 is positioned outside the diaphragm 2 in the X axis direction, and therefore it is possible to hardly generate a large stress in a bonding end portion of the sensor chip 4 and therefore to reduce a change in sensor characteristic.

Further, the dimension of the sensor chip 4 is desirably smaller than the dimension of the diaphragm 2, seen in the Y axis direction (in an XZ cross-section).

When the size of the sensor chip 4 is unnecessarily increased, a manufacturing cost of the sensor chip 4 is increased, and, for example, a thermal stress generated in a bonding portion of the sensor chip 4 due to the difference between the coefficients of thermal expansion of the sensor chip 4 and the diaphragm 2 may be increased. When the whole diaphragm 2 is attempted to be arranged within the sensor chip 4 having a limited size, the size of the diaphragm 2 is reduced. Thus, it is problematic in that stress distribution in the diaphragm 2 is steeply changed, and a region in which the strain gauges 7 can be arranged is limited, and, in addition, an influence of a positional shift of the strain gauges 7 is increased. When the size of the diaphragm 2 is reduced to be smaller than that of the sensor chip 4 in the short-side direction and is increased to be larger than that of the sensor chip 4 in the long-side direction, it is possible to prevent reduction in the size of the diaphragm 2 and to reduce a stress generated in an edge of the bonding portion of the sensor chip 4.

On the sensor chip 4, not only the bridge circuit, but also peripheral circuits such as an output amplifier, a current source, an A/D converter, an output correction circuit, a memory in which correction values are stored, and a temperature sensor can be formed. Because the above signal processing circuits are provided in the sensor chip 4, it is possible to perform amplification of an output signal, temperature correction, zero point correction, and the like, and therefore accuracy of the output signal can be increased. Regarding the temperature correction, because the strain gauges 7 and the temperature sensor can be provided on the same sensor chip 4, the temperature of the strain gauges 7 can be accurately measured, and therefore the temperature correction can be performed with high accuracy.

In Example 1, because the diaphragm 2 and the sensor housing 3 receiving a pressure are made of stainless steel having high proof stress, it is easy to form a sensor capable of measuring a high pressure range. The sensor can also be used when a liquid or gas serving as a measurement target has high corrosiveness. As the kind of stainless steel, for example, precipitation hardening stainless steel such as SUS630 is selected in the case where proof stress is important, and stainless steel having high corrosion resistance such as SUS316 is selected in the case where corrosion resistance is important, i.e., a material can be selected. Further, the material is not limited, to stainless steel and various materials can be selected considering, for example, proof stress, corrosion resistance, and a difference between coefficients of thermal expansion of the material and silicon.

Further, the material and the bonding process of the bonding layer 5 are not limited to the above material and process. When, for example, Au/Ge solder or Au/Si solder is used for the bonding layer 5, creep deformation of the bonding layer 5 can be further reduced. In the case where the creep deformation easily occurs but is allowable, various adhesives can be used. The bonding process is not only the above method using Au/Su pellet, but also, for example, a method of directly forming Au/Sn on the diaphragm or a back surface of the sensor chip by plating or the Like.

Figure 4A:
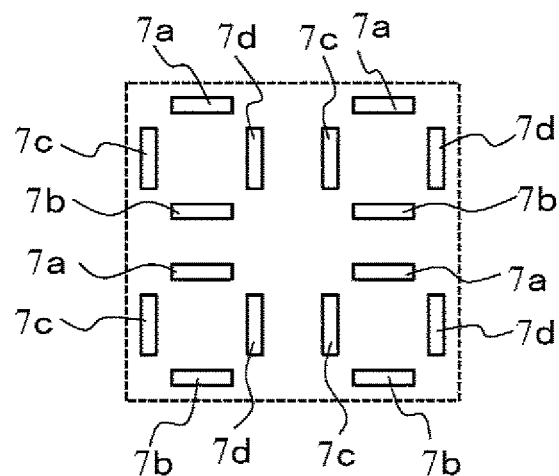
FIGS. 4A and 4B are schematic views illustrating Example 2 of the present invention.
Figure 4B:
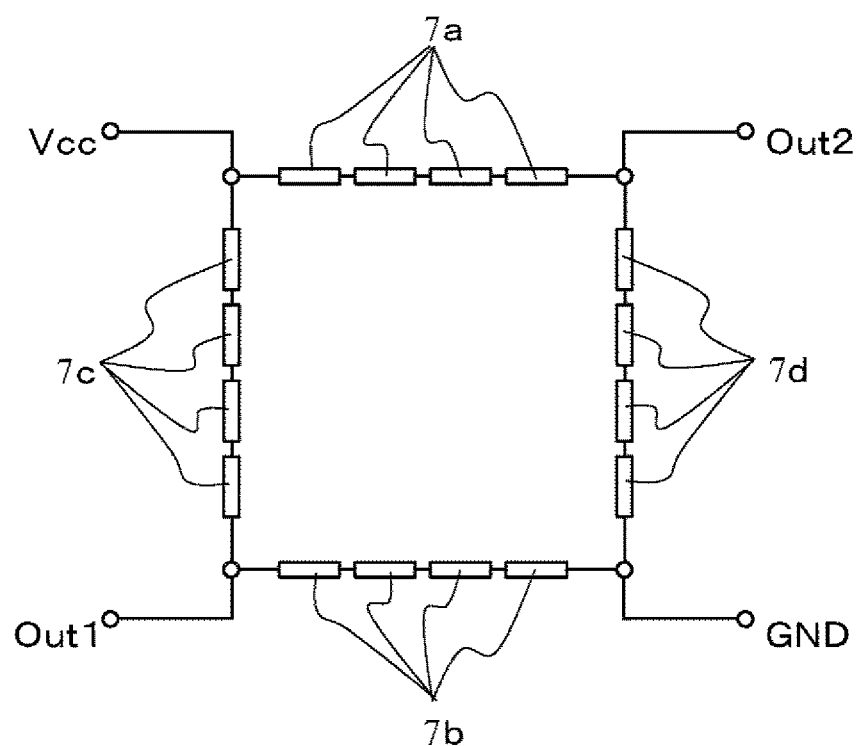

Example 2 of the present invention will be described with reference to FIGS. 4(*a*) and 4(*b*). Note that, regarding a configuration similar to the configuration in Example 1, the description thereof is omitted.

The first to fourth strain gauges 7*a* to 7*d* are configured by connecting a plurality of piezoresistors in series. FIG. 4(*a*) illustrates arrangement of the strain gauges 7 in the gauge region 6, and FIG. 4(*b*) illustrates a configuration of the bridge circuit. Four groups of piezoresistors constituting the first to fourth strain gauges 7*a* to 7*d* are arranged in the gauge region. Four divided first strain gauges 7*a* are connected by a wire (not illustrated) in series. The same applies to the second to fourth strain gauges 7*b* to 7*d*. Thus, as illustrated in FIG. 4(*b*), four divided strain gauges are grouped to constitute a bridge circuit equivalent to the bridge circuit illustrated in FIG. 2.

As described above, when the strain gauges are divided to be dispersedly arranged in the gauge region 6, it is possible to homogenize average values of stresses. For example, in the case where stress distribution is not uniform in the gauge region 6 and a gradient is generated in the Y direction, when the first strain gauge 7*a* is arranged in a positive region along the Y axis in the gauge region 6 and the second strain gauge 7*b* is arranged in a negative region along the Y axis, a stress difference is generated between both the strain gauges and output is therefore generated with the configuration of Example 2, the strain gauges are divided to be dispersedly arranged in the gauge region 6, and therefore it is possible to hardly generate a stress difference between the strain gauges 7.

Example 3 of the present invention will be described with reference to FIGS. 5(*a*) to 5(*c*). Note that, regarding a configuration similar to the configuration in Example 1, the description thereof is omitted.

FIGS. 5(*a*) to 5(*c*) are a plan view and cross-sectional views of Example 3 of the pressure sensor 1 in the present invention. In FIG. 5(*a*), the center line along the X axis is defined to be the X center line 10, and the center line along the Y axis as defined to be the Y center line 11. FIG. 5(*b*) is a cross-sectional view taken along the X center line 10, and FIG. 5(*c*) is a cross-sectional view taken along the Y center line 11.

The diaphragm 2 has a portion whose dimension in the short-side direction in a region from the center to the end portion in the long-side direction is larger than the dimension in the short-side direction in the vicinity of the center in the long-side direction, i.e., has a shape having a narrow central portion like a gourd. That is, assuming that the dimension of the diaphragm 2 on the X center line 10 is a diaphragm center dimension 12, the dimension in the X axis direction (diaphragm end portion dimension 13) in the vicinity of the end portion in the long-side direction of the diaphragm 2, which is shifted from the X center line 10 in the Y axis direction, is larger than the diaphragm center dimension 12.

In Example 3 having the narrow portion in the central portion of the diaphragm 2, it is possible to increase a stress difference between the short-side direction and long-side direction in the central portion of the diaphragm 2, as compared with the case where the central portion has no narrow portion. Because the sensor sensitivity is in proportion to the stress difference, stress use efficiency to the sensor sensitivity (a ratio of sensor sensitivity obtained with respect to the maximum stress generated in the strain gauges) is improved. Further, a change in stress distribution in the vicinity of the central portion of the diaphragm 2 is reduced, and therefore the influence of the positional shift can be further reduced.

Also in Example 3 the grooves 8a and 8b are provided in the sensor housing 3. When the grooves 8a and 8b are arranged to be adjacent to the sensor chip 4 in the long-side direction (Y axis direction) of the diaphragm 2, it is possible to obtain an effect that causes a Y-axis-direction stress to be close to an X-axis-direction stress, and the stress difference is reduced and the output change is reduced. In Example 3 in which the diaphragm has a gourd shape, the length of the diaphragm 2 in the X axis direction is increased at the positions at which the grooves 8 are arranged. Therefore, a region in which the thickness of the diaphragm 2 can be reduced by forming the grooves is wide, as compared with Example 1. Thus, the effect of reducing the stress in the Y axis direction is easily obtained, and the output chance can be easily reduced.

Figure 5A:
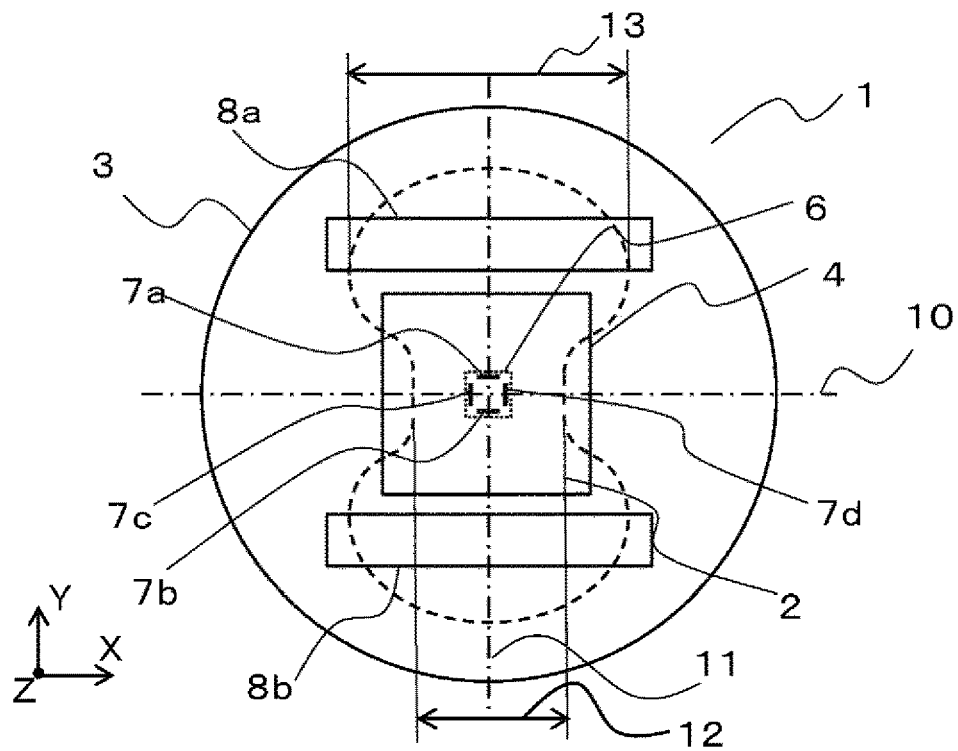
FIG. 5A is a plan view.
Figure 5B:
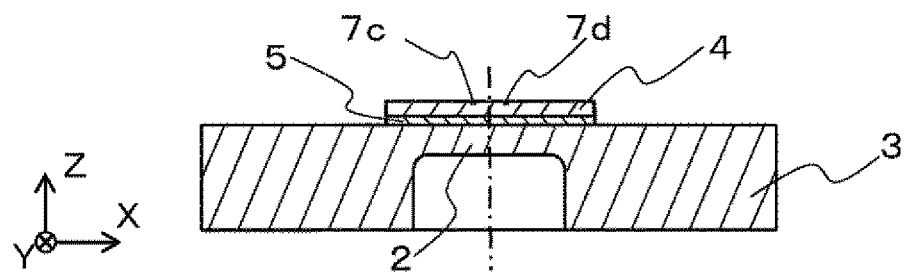
FIG. 5B is a cross-sectional view.
Figure 5C:
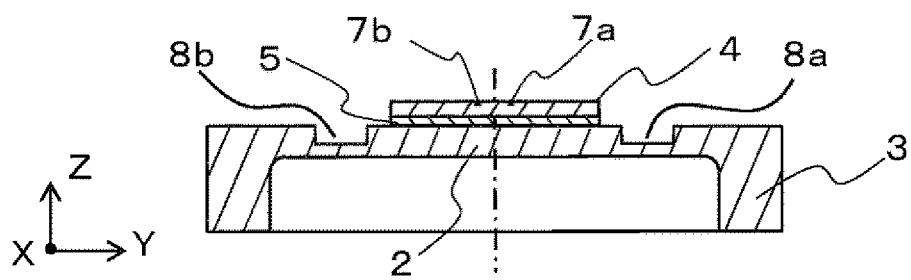
FIG. 5C is a cross-sectional view of Example 3 in the present invention.
Figure 6:
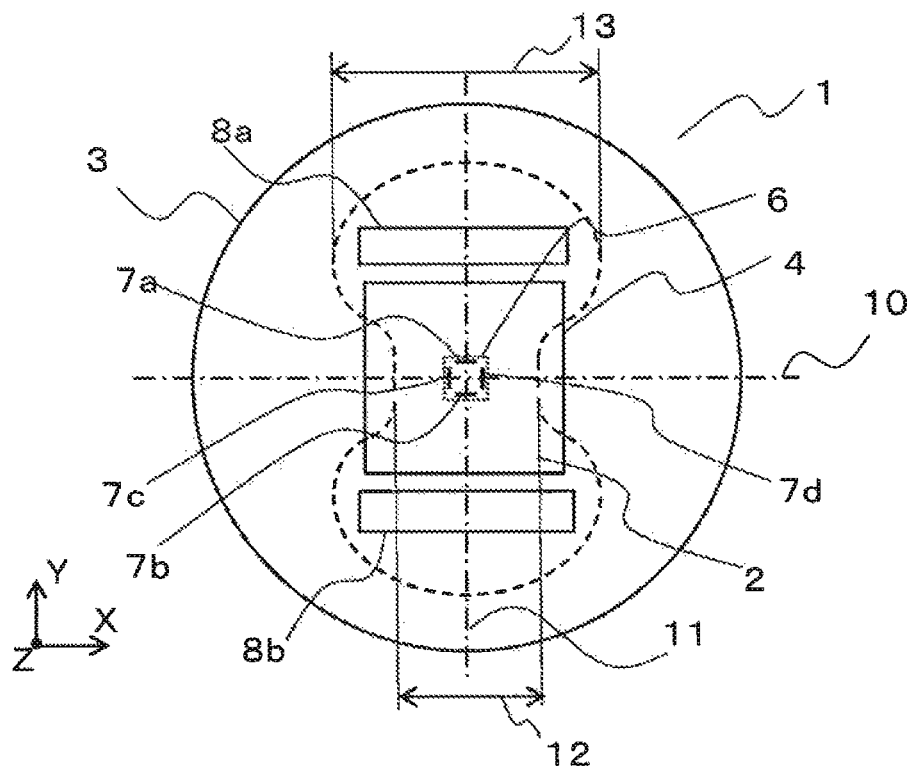
FIG. 6 is a plan view of a modification example of Example 3 in the present invention.

As illustrated in FIGS. 5(a) to 5(c), the grooves 8a and 8b can be formed so that the length in the X axis direction is longer than the length of the diaphragm 2, i.e., the grooves 8a and 8b can be formed to completely traverse the diaphragm 2 in the X axis direction. Meanwhile, as illustrated in a plan view of FIG. 6, the grooves 8a and 8b can also be formed to be within the external shape of the diaphragm 2. With this, a thickness before the grooves are formed can be provided in the end portion of the diaphragm 2. A stress generated in the diaphragm 2 when a pressure is applied is higher in the end portion of the diaphragm 2, and therefore, because the thickness of the end portion is provided, the maximum stress generated in the diaphragm 2 is reduced, and it is possible to hardly generate plastic deformation. The length of the grooves 8a and 8b in the X axis method is desirably longer than the length of the sensor chip 4. However, a certain effect can be obtained even in the case where the length is shorter than that of the sensor chip 4 and is not limited. As illustrated in the modification example of FIGS. 3(a) to 3(c) in Example 1, the grooves 8a and 8b may be provided like steps formed in a wide region so as to reach the end portion of the sensor housing 3. With this, the region of the thin portion of the diaphragm 2 is increased, and the effect of reducing the stress in the Y axis direction is improved. Further, the structure of the sensor housing 3 is simplified, and therefore the sensor housing 3 can be easily manufactured.

As the configuration of the strain gauges in Example 3 described above, the configuration described in Example 2 can also be used. With this, it is possible to obtain an effect similar to the effect described in Example 2.

Example 4 of the present invention will be described with reference to FIGS. 7(a) to 7(c). Note that, regarding a configuration similar to the configuration in Example 1, the description thereof is omitted.

Figure 7A:
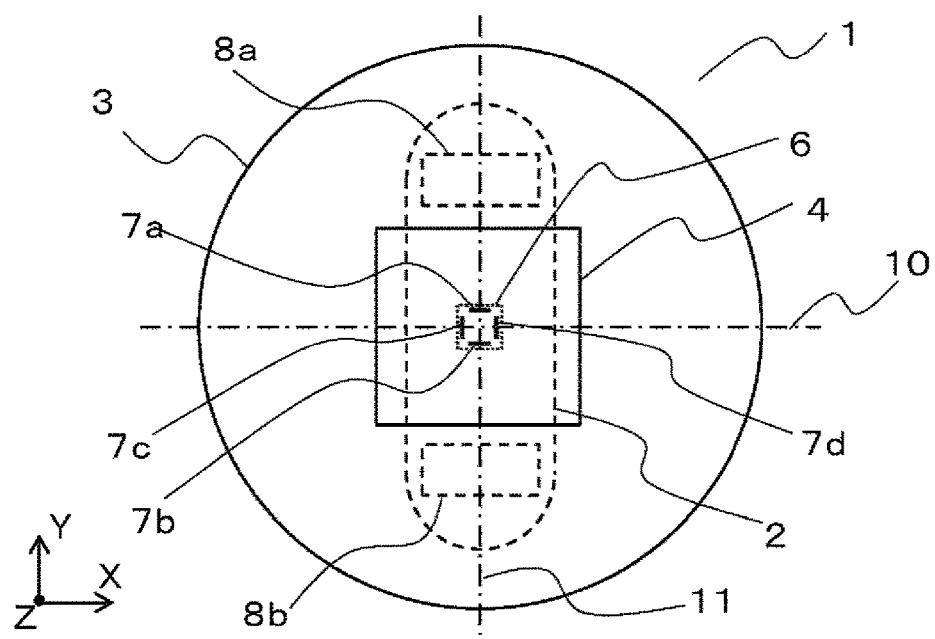
FIG. 7A is a plan view.
Figure 7B:
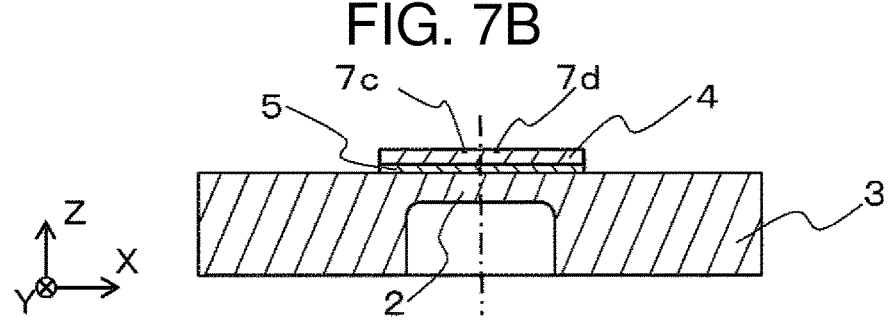
FIG. 7B is a cross-sectional view.
Figure 7C:
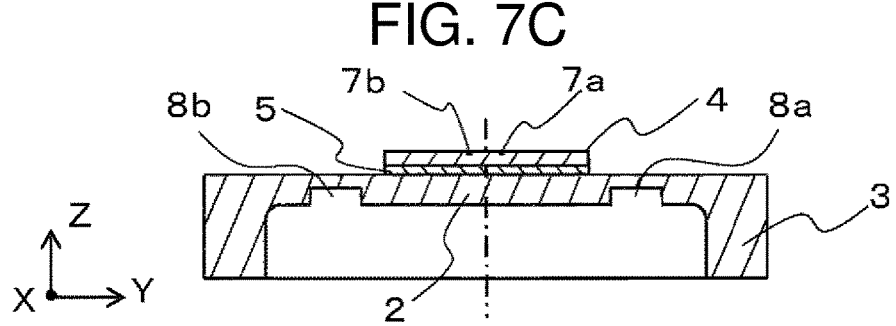
FIG. 7C is a cross-sectional view of Example 4 in the present invention.

FIGS. 7(a) to 7(c) are a plan view and cross-sectional views of Example 4 of the pressure sensor 1 in the present invention. In FIG. 7(a), the center line along the X axis is defined to be the X center line 10, and the center line along the Y axis is defined to be the Y center line 11. FIG. 7(b) is a cross-sectional view taken along the X center line 10, and FIG. 7(c) is a cross-sectional view taken along the Y center line 11.

In Example 4, the grooves 8 (first groove 8a and second groove 8b) are provided on the surface opposite to the surface of the diaphragm 2 to which the sensor chip 4 is bonded. Also in this configuration, thin portions of the diaphragm 2 are provided in the long-side direction seen from the sensor chip 4, and therefore it is possible to reduce the Y-axis-direction stress at the center of the sensor chip 4 and to reduce the output change in response to a change in temperature. In the configuration in Example 4, it is advantageous that processing only needs to be performed in one direction when the diaphragm 2 and the grooves 8 are formed on the sensor housing 3.

Figure 8A:
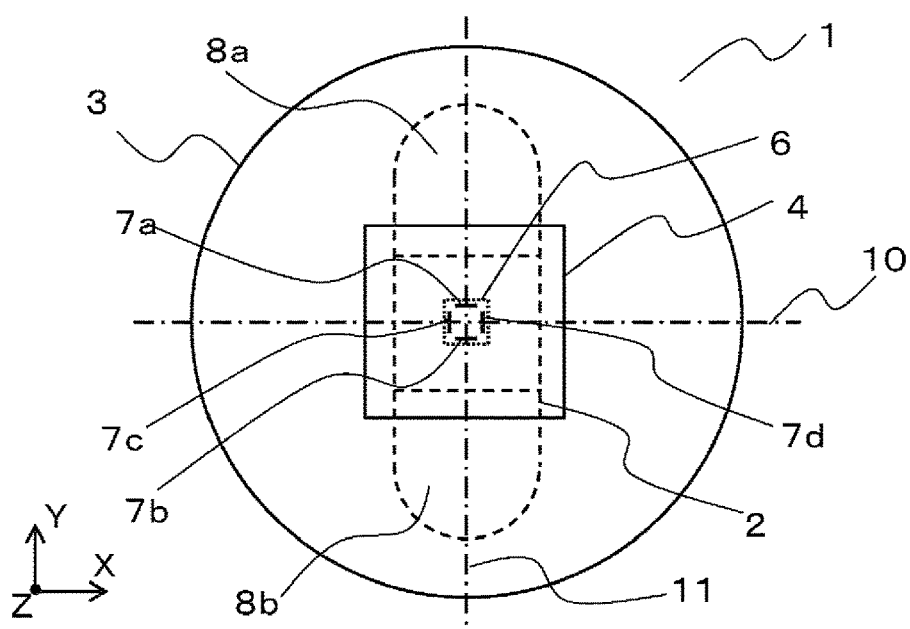
FIG. 8A is a plan view.
Figure 8B:
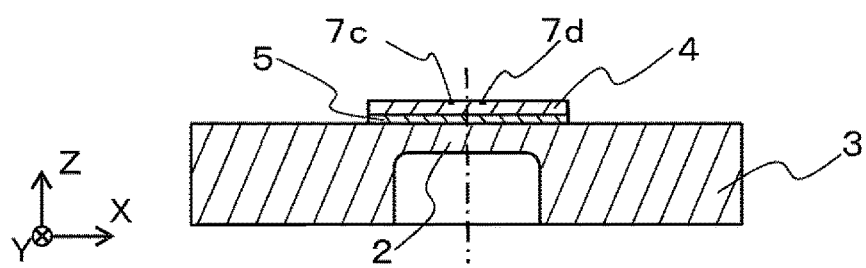
FIG. 8B is a cross-sectional view.
Figure 8C:
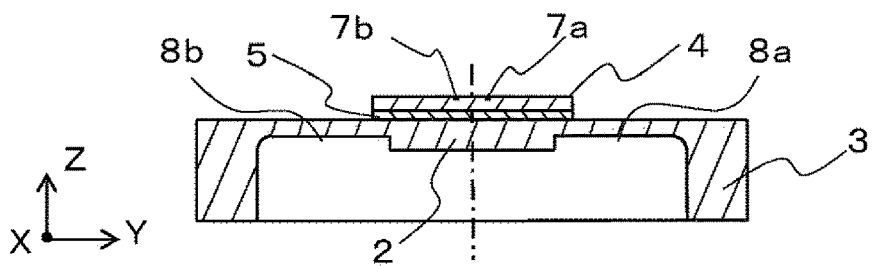
FIG. 8C is a cross-sectional view of a modification example of Example 4 in the present invention.

FIGS. 8(a) to 8(c) illustrate a modification example of Example 4. In FIG. 8(a), the center line along the X axis is defined to be the X center line 10, and the center line along the Y axis is defined to be the center line 11. FIG. 8(b) is a cross-sectional view taken along the X center line 10, and FIG. 8(c) is a cross-sectional view taken along the Y center line 11.

As in this modification example, the grooves 8a and 8b provided in the diaphragm 2 may reach the end portion of the diaphragm 2. Further, because the grooves are provided in the surface opposite to the surface to which the sensor chip 4 is bonded, the grooves 8 may reach the inside of the external shape of the sensor chip 4. In both cases, it is possible to increase the region of the thin portion of the diaphragm 2, and the effect of reducing the Y-axis-direction stress is high.

Although not illustrated, also in the case where a diaphragm having a gourd shape is used as in Example 3 illustrated in FIGS. 5(a) to 5(c), it is possible to form the grooves 8a and 8b on the surface opposite to the surface to which the sensor chip 4 is bonded as in Example 4.

As the configuration of the strain gauges in Example 4, the configuration described in Example 2 can also be used. With this, it is possible to obtain an effect similar to the effect described in Example 2.

Example 5 of the present invention will be described with reference to FIG. 9. Note that, regarding a configuration similar to the configuration in Example 1, the description thereof is omitted.

Figure 9:
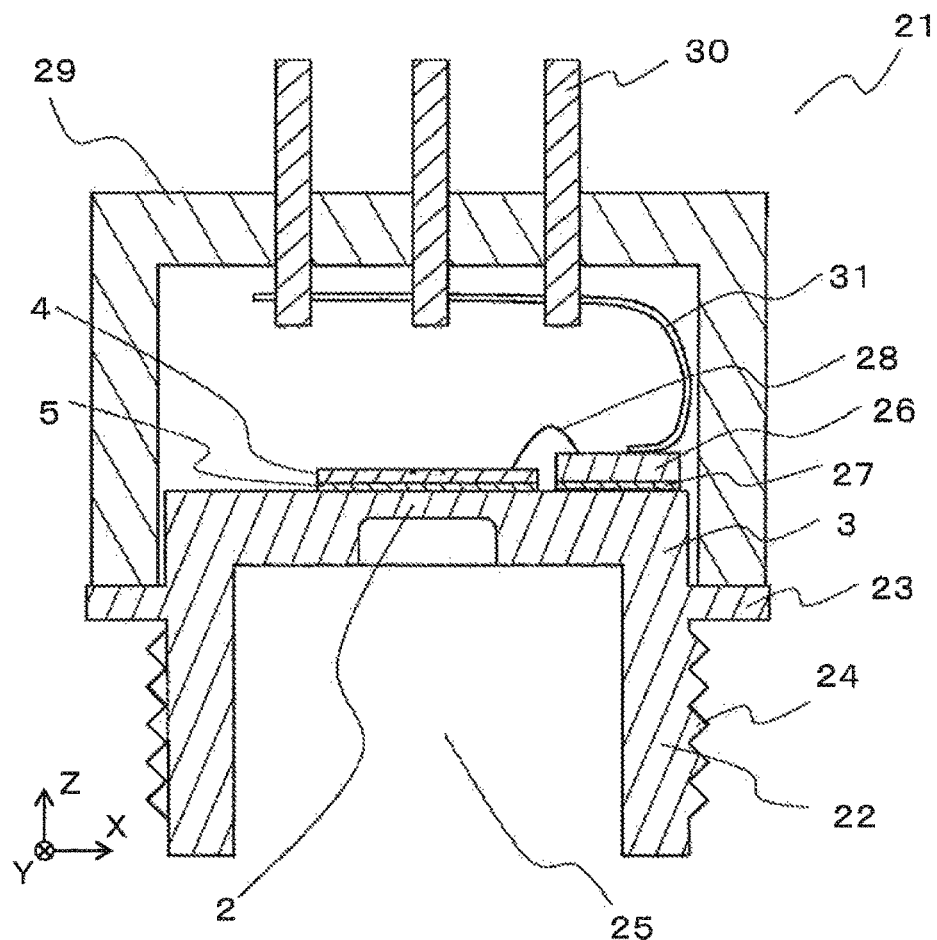
FIG. 9 is a cross-sectional view of Example 5 in the present invention.

FIG. 9 illustrates a cross-sectional view of Example 5 of the pressure sensor in the present invention. Example 5 shows a configuration example of a pressure sensor assembly 21 formed as a product by assembling any one of the pressure sensors described in Example 1 to Example 4.

The sensor housing 3 includes not only any one of the configurations described in Example 1 to Example 4 but also a cylindrical portion 22 whose outer circumferential portion is cylindrically extended downward and is integrally formed to have a flange portion 23 and a screw portion 24 on an outer surface thereof. The screw portion 24 is a male screw and is attached to a joint of a female screw (not illustrated) prepared on a pipe of a measurement target. A pressure introduction port 25 is formed in the cylindrical portion 22, and a liquid or gas serving as a measurement target is introduced via this pressure introduction port 25 to the surface of the diaphragm 2. On an upper surface of the sensor housing 3, a wiring board 26 is arranged to be adjacent to the sensor chip 4. The wiring board 26 is adhered by an adhesive 27 to be held on the upper surface of the sensor housing 3. Electrode pads of the sensor chip 4 and the wiring board 26 are electrically connected by a wire 28. In order to protect the surface of the sensor chip 4 and a peripheral portion thereof, a cylindrical cover 29 is provided to be connected to the flange portion 23 of the sensor housing 3. In an upper end of the cover 29, a plurality of external electrode pins 30 is provided to penetrate the cover 29. The external electrode pins 30 and the wiring board 26 are electrically connected via a flexible wiring board 31. The sensor chip 4 transmits a signal to an external device via the wire 28, the wiring board 26, the flexible wiring board 31, and the external electrode pins 30. With the configuration in Example 5, it is possible to obtain the pressure sensor assembly 21 that can be easily attached to a pipe of a device serving as a measurement target, the pressure sensor assembly being assembly in which electricity is easily supplied to the sensor and wiring for extracting a signal is easily provided.

In the pressure sensor assembly 21 in Example 5, it is problematic in that, in the case where force is applied to the sensor assembly 21 when the sensor assembly is screwed on the pipe of the measurement target, deformation is transmitted to the sensor housing 3, and the stress at the center of the sensor chip 4 is changed to thereby change the sensor output in some cases. Although the above force is supposed to be isotropically applied in the X axis and the Y axis, the above stress, as well as a behavior in response to a change in temperature, becomes anisotropic because the diaphragm 2 has the anisotropic shape.

Because the grooves 8a and 8b are provided in the long-side direction of the diaphragm 2 in the pressure sensor of the present invention, the effect that causes the X-axis-direction stress and the Y-axis-direction stress generated at the center of the sensor chip 4 to be close to each other is also exerted upon an influence of the force Generated at the time of screwing. This makes it possible to reduce the change in sensor output.

Hereinafter, results of verification of the effect obtained by the present invention will be described.

Figure 10:
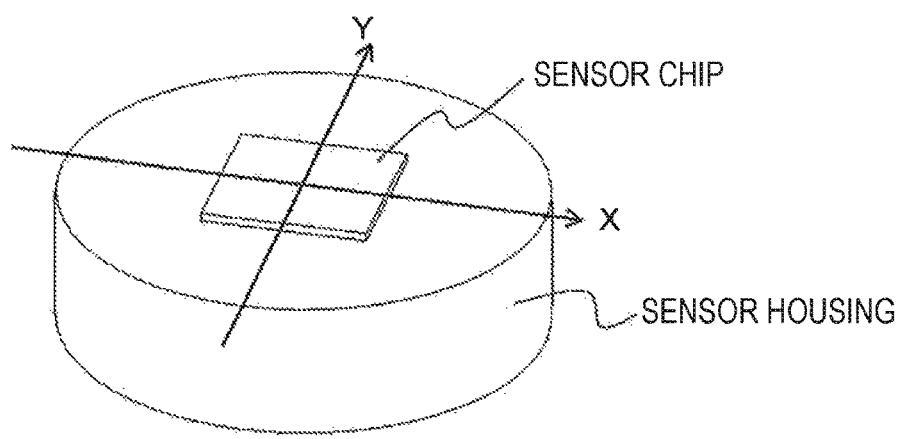
FIG. 10 is a perspective view illustrating an outline of a shape of a model used in verification based on analysis.

In order to verify the effect of reducing the output change in response to a change in temperature in the present invention, the effect being obtained by forming the grooves 8a and 8b, numerical analysis using the finite element method (FEM) was performed. FIG. 10 is a perspective view illustrating a shape of a model used in the analysis. The model has a shape in which a rectangular sensor chip is provided at the center of a disk-shaped sensor housing, and illustration of a bonding layer is omitted. In order to check the output change in response to a change in temperature, analysis was implemented by increasing a temperature by 1° C. The sensor chip is made of silicon and has a coefficient of thermal expansion of $2.5 \times 10^{-6}/°$ C. The sensor housing is made of stainless steel and has a coefficient of thermal expansion of $10.8 \times 10^{-6}/°$ C. when the temperature is increased, the sensor housing having a larger coefficient of thermal expansion is expanded more, and thus a tensile stress is generated in the whole sensor chip.

Figure 11A:
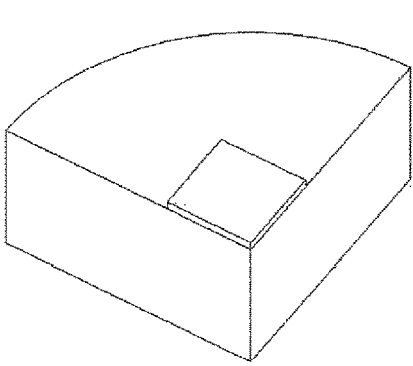
FIGS. 11A to 11C are perspective views illustrating dimensions of three models used in verification based on analysis.
Figure 11B:
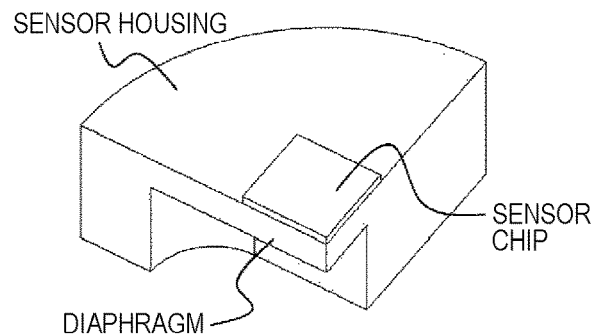
Figure 11C:
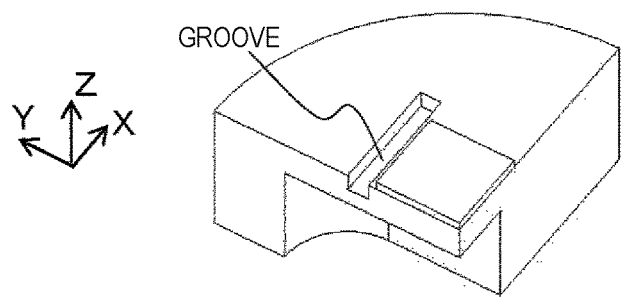

FIGS. 11(a) to 11(c) illustrate shapes of analysis models used in comparative study. Analysis is implemented by using XY-symmetrical ¼ models because the models are symmetrical about the X axis and the Y axis, and FIGS. 11(a) to 11(c) also illustrate the shapes of the ¼ models. A model 1 illustrated in FIG. 11(a) is a disk in which a sensor housing has no diaphragm, and therefore a stress is similarly applied to a sensor chip in both the X axis direction and the Y axis direction. A model 2 in FIG. 11(b) is obtained by forming a rectangular diaphragm having a short side in the X axis direction and a long side in the Y axis direction. A model 3 illustrated in FIG. 11(c) is obtained by adding a groove to a share of the model 2. The groove is arranged to be adjacent to the sensor chip in the long-side direction seen from the sensor chip, and the length of the groove in the short-side direction is longer than that of the sensor chip. A depth of the groove is half a thickness of the diaphragm.

Figure 12:
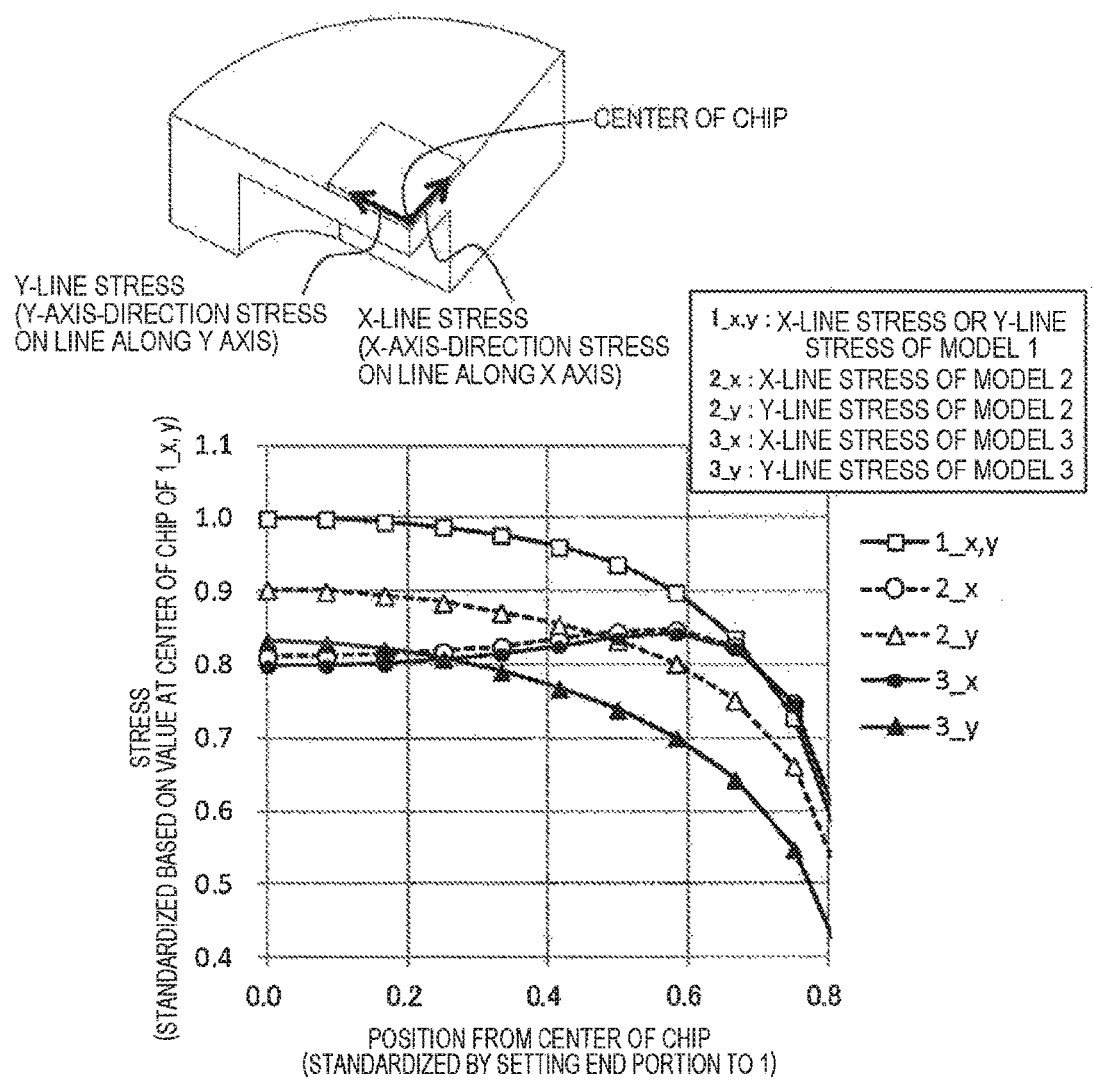
FIG. 12 is a graph showing an analysis result of a change in temperature in each model.

FIG. 12 is a graph showing stress distribution of analysis results. FIG. 12 shows the stress distribution of a surface of the sensor chip on which strain gauges are provided. As shown in FIG. 12, an X-axis-direction stress on a line drawn along the X axis from the center of the sensor chip is defined to be an X-line stress, and a Y-axis-direction stress on a line drawn along the Y axis from the center is defined to be a Y-line stress. The graph of FIG. 12 shows the X-line stresses and Y-line stresses regarding the analysis results of the models 1 to 3. A horizontal axis of the graph indicates a distance from the center of the sensor chip, the distance being standardized by setting an end portion of the sensor chip to 1. A stress in a vertical axis of the graph is shown while being standardized by setting the stress at the center of the sensor chip in the model 1 to 1.

In the model 1 having no diaphragm, distribution of the X-line stress and distribution of the Y-line stress match with each other, and those stresses are tensile stresses at the center of the sensor chip. In the model 2 in which the rectangular diaphragm is provided, the stresses at the center of the sensor chip are reduced, as compared with the model 1, and the X-line stress is smaller than the Y-line stress. Because a thickness of a portion of the diaphragm is reduced, as compared with the model 1, the rigidity of the sensor housing is reduced and force that pulls the sensor chip is reduced, and the stress is accordingly reduced. Further, in a stacking structure of the thin diaphragm and the sensor chip, warpage deformation (out-of-plane bending deformation) also occurs due to a difference in thermal expansion between both the thin diaphragm and the sensor chip, and a stress caused by warpage acts in a compression direction on the surface of the sensor chip and slightly alleviates a tensile stress. At this time, a curvature of the warpage deformation is small in the X axis direction because the diaphragm is short, and therefore an alleviation amount of the tensile stress at the center of the sensor chip is larger than an alleviation amount thereof in the Y axis direction. Therefore, it is considered that the X-axis-direction stress is reduced to be smaller than the Y-axis-direction stress at the center of the sensor chip at which the strain gauges are provided, and therefore an XY stress difference is generated and output is accordingly changed. Regarding the result of the model 3 in which the groove is provided, distribution of the X-line stress is substantially the same as the distribution in the model 2 but distribution of the Y-line stress is smaller than that of the Y-line stress in the model 2. Because the groove is provided in the Y axis direction seen from the sensor chip, the rigidity of the sensor housing is reduced and the force that pulls the sensor chip is reduced only in the Y axis direction. With this, only the Y-axis-direction stress could be reduced. As a result, the Y-axis-direction stress becomes close to the X-axis-direction stress and the XY stress difference is accordingly reduced, and thus the output change can be reduced. In the results of this analysis, the XY stress difference at the center of the sensor chip is 0.092 in the model 2 and 0.034 in the model 3. Assuming that the sensor output is in proportion to the XY stress difference at the center of the sensor chip, the chance in sensor output (i.e., temperature characteristic) in response to a change in temperature could be reduced by about 63% because of addition of the groove.

REFERENCE SIGNS LIST 1 pressure sensor
2 diaphragm 3 sensor housing
4 sensor chip
5 bonding layer
6 gauge region
7a first strain gauge
7b second strain gauge
7c third strain gauge
7d fourth strain gauge
8a first groove
8b second groove
X center line
Y center line
12 diaphragm center dimension
13 diaphragm end portion dimension
21 pressure sensor assembly
22 cylindrical portion
23 flange portion
24 screw portion
25 pressure introduction port
26 wiring board
27 adhesive
28 wire
29 cover
30 external electrode pin
31 flexible wiring board

The invention claimed is:

1. A pressure sensor, comprising:
a sensor housing having a diaphragm shaped to have a long side and a short side; and
a sensor chip including four strain gauges, wherein,
in the pressure sensor, the sensor chip is provided on the sensor housing such that the four strain gauges are positioned in a region of the diaphragm,
two strain gauges of the four strain gauges are provided on the sensor chip in a short-side direction of the diaphragm,
the other two strain gauges are provided on the sensor chip in a long-side direction of the diaphragm,
the four strain gauges are provided on the sensor chip so as to be positioned in a central portion of the diaphragm, and
the minimum thickness of the diaphragm in a cross-section in the long-side direction, the cross-section being across the center of the diaphragm, is thinner than the minimum thickness of the diaphragm in a cross-section in the short-side direction, the cross-section being across the center of the diaphragm.

2. The pressure sensor according to claim 1, wherein the diaphragm has, in the long-side direction seen from the sensor chip, a thin portion whose thickness is thinner than a thickness of a region in which the sensor chip is mounted.

3. The pressure sensor according to claim 2, wherein
the sensor housing has a groove on a side in the long-side direction with respect to the sensor chip, and
the thin portion is formed by the groove.

4. The pressure sensor according to claim 3, wherein
the groove is provided on a surface of the sensor housing, the surface being a surface on which the sensor chip is mounted, and
a length of the groove in the short-side direction is longer than a length of the sensor chip in the short-side direction.

5. The pressure sensor according to claim 2, wherein the thin portion is formed by a step provided on a surface of the sensor housing, the surface being a surface on which the sensor chip is mounted.

6. The pressure sensor according to claim 1, wherein the minimum thickness of the diaphragm in the cross-section in the long-side direction is formed by a groove provided on a side of the diaphragm, the side being a side that receives a pressure.

7. The pressure sensor according to claim 1, wherein the diaphragm is shaped so that the maximum dimension in the short-side direction between the center and an end portion of the diaphragm in the long-side direction is larger than a dimension in the short-side direction in the vicinity of the center in the long-side direction.

8. The pressure sensor according to claim 1, wherein a dimension in the short-side direction at the center of the diaphragm is smaller than a dimension of the sensor chip.

9. The pressure sensor according to claim 8, wherein a dimension in the long-side direction at the center of the diaphragm is larger than the dimension of the sensor chip.

10. The pressure sensor according to claim 1, wherein each of the four strain gauges is p-type single crystal silicon formed along a <110> crystal orientation.

11. A pressure sensor, comprising:
a sensor housing having a diaphragm shaped to have a long side and a short side; and
a sensor chip including four strain gauges, wherein,
in the pressure sensor, the sensor chip is provided on the sensor housing such that the four strain gauges are positioned in a region of the diaphragm,
two strain gauges of the four strain gauges are provided on the sensor chip in a short-side direction of the diaphragm,
the other two strain gauges are provided on the sensor chip in a long-side direction of the diaphragm,
the four strain gauges are provided on the sensor chip so as to be positioned in a central portion of the diaphragm,
the minimum thickness of the diaphragm in a cross-section in the long-side direction, the cross-section being across the center of the diaphragm, is thinner than the minimum thickness of the diaphragm in a cross-section in the short-side direction, the cross-section being across the center of the diaphragm,
the central portion of the diaphragm is shorter than: i) any side of the sensor chip, and ii) the long-side of the diaphragm, and
the central portion of the diaphragm is longer than a distance separating any of the strain gauges from one another.

12. The pressure sensor according to claim 11, wherein the diaphragm has, in the long-side direction seen from the sensor chip, a thin portion whose thickness is thinner than a thickness of a region in which the sensor chip is mounted.

13. The pressure sensor according to claim 12, wherein
the sensor housing has a groove on a side in the long-side direction with respect to the sensor chip, and
the thin portion is formed by the groove.

14. The pressure sensor according to claim 13, wherein
the groove is provided on a surface of the sensor housing, the surface being a surface on which the sensor chip is mounted, and
a length of the groove in the short-side direction is longer than a length of the sensor chip in the short-side direction.

15. The pressure sensor according to claim 12, wherein the thin portion is formed by a step provided on a surface of the sensor housing, the surface being a surface on which the sensor chip is mounted.

16. The pressure sensor according to claim 11, wherein the minimum thickness of the diaphragm in the cross-section in the long-side direction is formed by a groove provided on a side of the diaphragm, the side being a side that receives a pressure.

17. The pressure sensor according to claim 11, wherein the diaphragm is shaped so that the maximum dimension in the short-side direction between the center and an end portion of the diaphragm in the long-side direction is larger than a dimension in the short-side direction in the vicinity of the center in the long-side direction.

18. The pressure sensor according to claim 11, wherein a dimension in the short-side direction at the center of the diaphragm is smaller than a dimension of the sensor chip.

19. The pressure sensor according to claim 18, wherein a dimension in the long-side direction at the center of the diaphragm is larger than the dimension of the sensor chip.

20. The pressure sensor according to claim 11, wherein each of the four strain gauges is p-type single crystal silicon formed along a <110> crystal orientation.

* * * * *